United States Patent [19]

Harris

[11] 4,144,638

[45] Mar. 20, 1979

[54] STATOR WIRE-CUTTING MACHINE

[75] Inventor: Scott Harris, Jonesboro, Ark.

[73] Assignee: Abilities Unlimited, Inc., Jonesboro, Ark.

[21] Appl. No.: 862,651

[22] Filed: Dec. 20, 1977

[51] Int. Cl.² .................. B26D 7/18; B26D 1/02; B23P 19/00

[52] U.S. Cl. ........................... 29/762; 83/78; 83/779; 83/924; 29/427

[58] Field of Search .............. 83/78, 779, 924, 54; 29/762

[56] References Cited

U.S. PATENT DOCUMENTS

| | | | |
|---|---|---|---|
| 1,608,350 | 11/1926 | Waller | 29/762 |
| 2,923,443 | 11/1955 | McKibben | 29/762 |
| 3,111,147 | 11/1963 | Pollak | 83/779 |
| 3,146,520 | 9/1964 | D'Eustachio | 29/762 |

Primary Examiner—Donald R. Schran

Attorney, Agent, or Firm—Finnegan, Henderson, Farabow & Garrett

[57] ABSTRACT

A stator wire-cutting machine for cutting and removing the wires from a pre-positioned electric motor stator, including a planar support for substantial alignment with the axis of the stator, a cutter disc and a kick-out disc, both rotatably mounted on the support, a cutting blade rotatably mounted on the cutter disc and a pointed puller bar similarly mounted on the kick-out disc, a pair of adjustable guides for aligning the cutting blade and the puller bar with the stator wires, springs for biasing the blade and puller against the guides, and an adjustable lever arm with connecting linkage for causing counter-rotation of the two discs. The cutting blade and the puller bar are rotatable with respect to the cutter disc and kick-out disc, respectively, at predetermined points during the counter-rotation of the discs. The positions of both discs can be adjusted within the support, for accommodating various sizes of stators.

20 Claims, 2 Drawing Figures

STATOR WIRE-CUTTING MACHINE

BACKGROUND OF THE INVENTION

This invention relates to wire-cutting machines and, more particularly, machines for efficiently and economically salvaging wire from small defective or worn out electric motor stators. The cutting machine of the invention is designed to remove the wire windings rapidly and efficiently from such stators, and is particularly useful in a recycling operation for salvaging this valuable copper material. With the escalating costs of locating and refining natural resources, the reuse of potentially scarce minerals has become increasingly important. This invention makes the salvaging process economically possible by allowing rapid, efficient wire removal.

While, prior to this invention, stator wire could certainly be recovered manually using conventional wire cutters and tools known to those of ordinary skill in the art, no machine is believed to exist which includes all the advantages of the present invention. Manual removal of stator wire is a slow, expensive operation and the costs of wire recovery, under those circumstances, are often prohibitively high.

The present invention, which cuts and removes the stator wire in one continuous operation, is highly efficient and therefore greatly reduces the labor costs of such a recycling effort.

A typical small (fractional) horsepower electric motor stator includes a cylindrical casing having apertures running longitudinally through its walls. Copper wire windings are looped in bundles through the apertures such that the wire bundles are exposed on two outer surfaces of the casing. The wires are tightly wound and normally fit with close tolerance into these apertures. This configuration often makes manual removal of the wires awkward and difficult.

The present invention solves this problem by providing a mechanism which easily penetrates the windings at both of the exposed surfaces, and quickly cuts and removes each bundle of wires in one operation.

The invention may be used to remove wire from stators of varying diameters and widths by utilizing different sized carrousels to hold the stators, and by adjusting the blade separation distance to correspond to the stator casing depth of the stators being cut. The machine is provided with several adjusting mechanisms for this purpose.

In addition, the specific structure of the machine can be adapted to other uses including removal of stator wire which has been previously cut by other means, or simply cutting the wire for later removal by alternative methods.

Accordingly, it is a primary object of this invention to provide a new mechanism for removing wire from electric motor stators.

A further object of this invention is to provide a machine which easily penetrates the wire windings of such a stator and quickly cuts and removes each bundle of wires in one operation.

A still further object of this invention is to provide a machine which reduces the costs of recycling copper wire from electric motor stators.

Another object of the invention is to provide a machine which can be used to cut and remove wire quickly and efficiently from electric motor stators of varying sizes.

Additional objects and advantages of the invention will be set forth in part in the description which follows, and in part will be obvious from the description, or may be learned by practive of the invention. The objects and advantages of the invention may be realized and attained by means of the instrumentalities and combinations particularly pointed out in the appended claims.

SUMMARY OF THE INVENTION

To achieve the foregoing objects and in accordance with the purpose of the invention, as embodied and broadly described herein, the stator wire-cutting machine of this invention comprises a planar support for substantial alignment with the axis of the stator; a cutter disc and a kick-out disc rotatably mounted on the support; means for causing the counter-rotation of the discs; knife means and penetration means rotatably and respectively mounted on the cutter disc and the kick-out disc for penetration of the wires of the stator upon limited counter-rotation of the discs; means mounted on the cutter disc for rotating the knife means with respect to the cutter disc and thereby cutting the wires upon further rotation of the cutter disc; support mounted on the kick-out disc; and a stud mounted on the support interacting with the means mounted on the kick-out disc for causing rotation of the penetration means with respect to the kick-out disc and pulling the wires out of the stator after the wires have been cut by the rotation of the knife means.

Preferably, the machine includes two adjustable guides mounted on the frame for substantially aligning the knife means and the penetration means with the wires of the stator. It is also preferred that the knife means include an elongated blade having a sharpened end and notched end. The cutting blade is preferably biased against the guide to maintain substantial alignment with the wires throughout the penetration. Similarly, the penetration means preferably includes an elongated puller bar, pointed at one end, which is also held against the guide under a bias.

Preferably also, the means for counter-rotation of the discs comprises a lever-actuated mechanism which includes various means for adjustment. It is also preferred that both the cutter disc and the kick-out disc be adjustably mounted on the support.

BRIEF DESCRIPTION OF THE DRAWINGS

The accompanying drawings, which are incorporated in and constitute a part of this specification, illustrate one embodiment of the invention and, together with the description, serve to explain the principles of the invention.

Of the drawings.

DESCRIPTION OF THE PREFERRED EMBODIMENTS

Reference will now be made in detail to the present preferred embodiment of the invention, an example of which is illustrated in the accompanying drawings.

Figure 1:
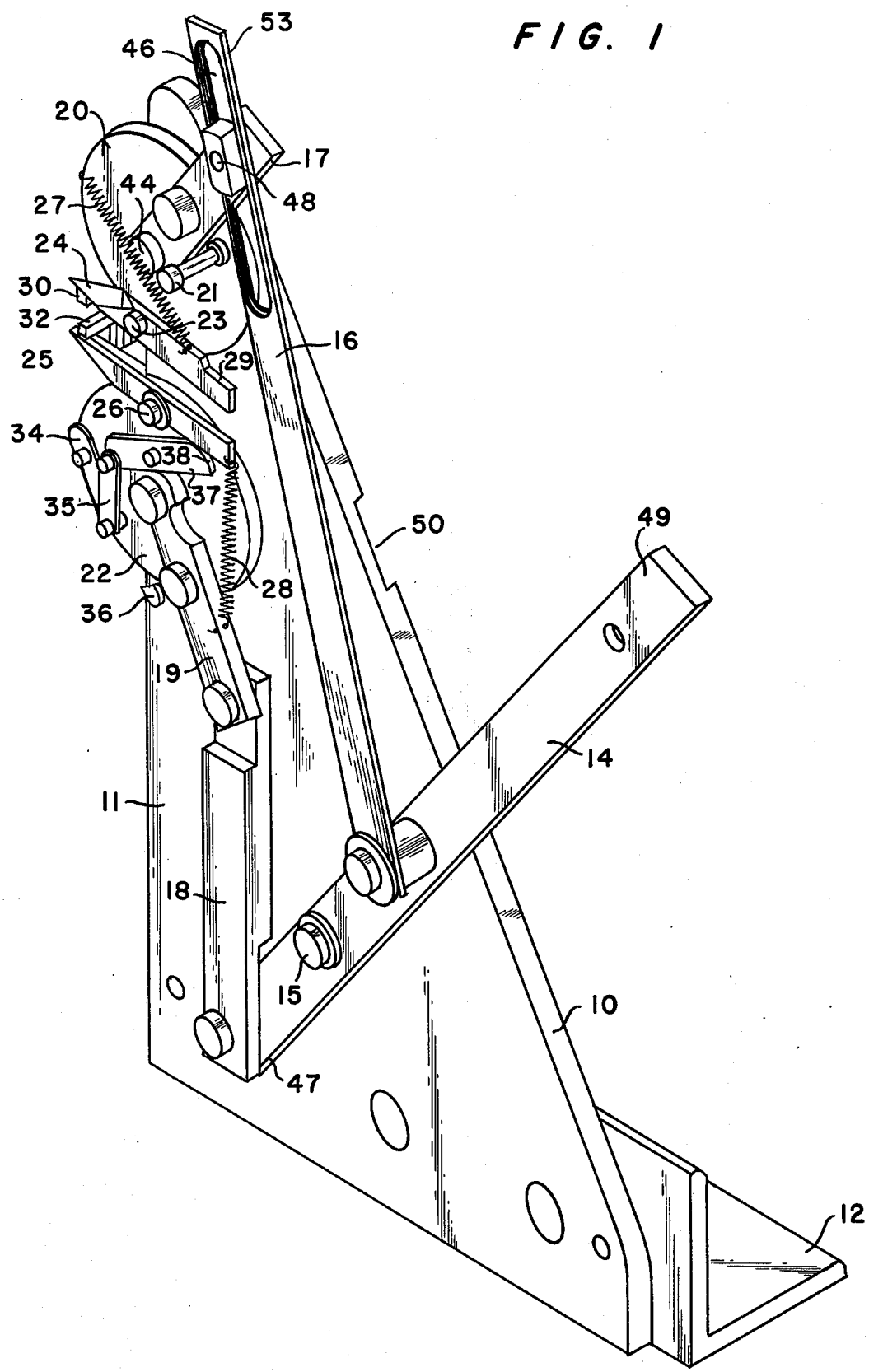
FIG. 1 is a perspective view of an assembled stator wire-cutting machine constructed in accordance with the teachings of this invention.
Figure 2:
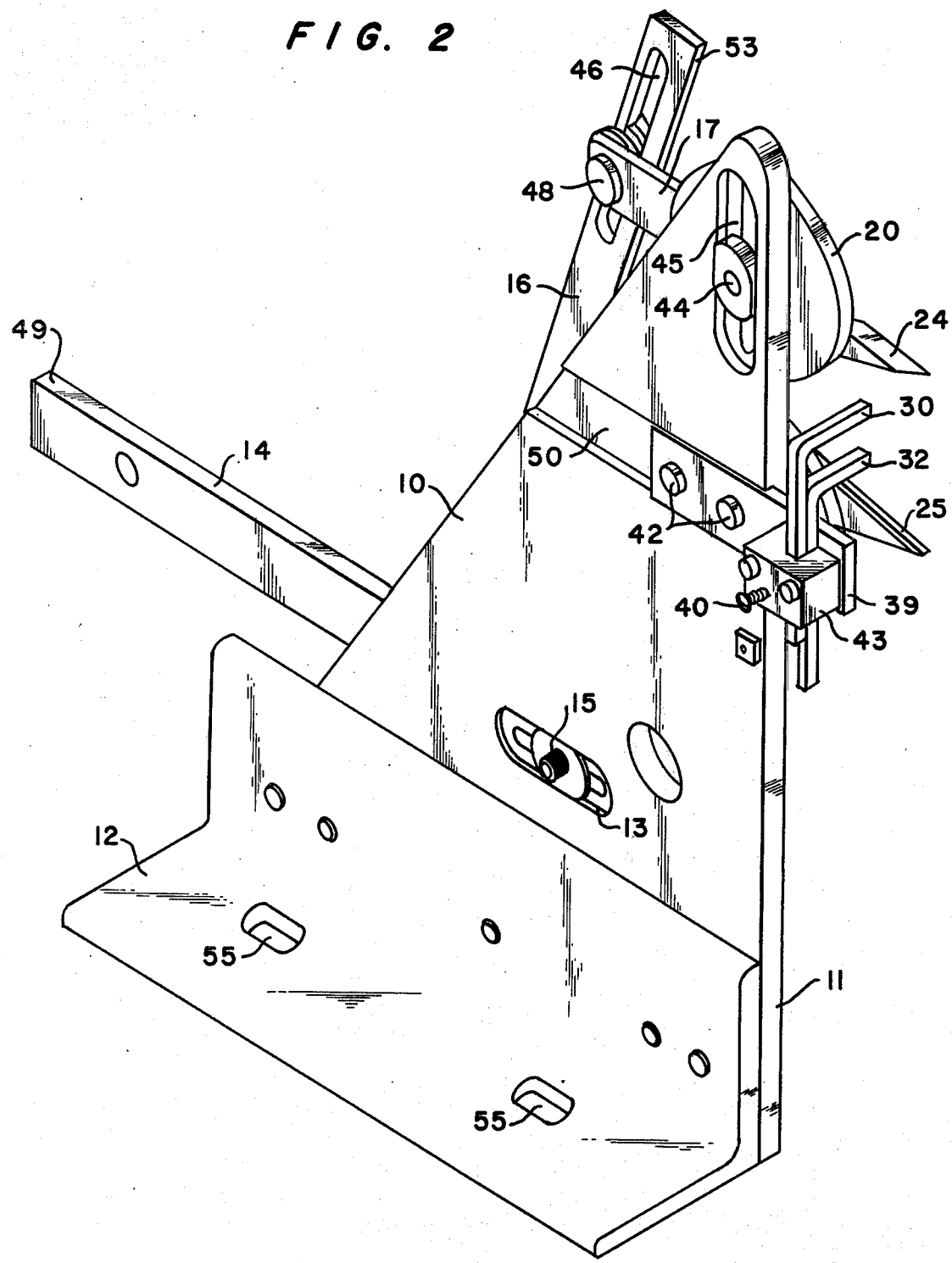
FIG. 2 is a perspective view of the opposite side of the stator wire-cutting machine showing the various means for adjustment.

Referring now to FIGS. 1 and 2, it may be seen that the cutting machine is highly useful for removing the windings from typical motor stators. In accordance with the invention as embodied herein, the stator wire-cutting machine generally includes a right triangular shaped support 10, which is held in a vertical position by an L-shaped bracket 12. The bracket 12 may be provided with mounting bolt holes 55 for securing the stator wire-cutting machine to a fixed base. A cutter disc 20 is rotatably mounted on the support 10 near the upper end thereof. A portion of the cutter disc 20 extends beyond the forward edge 11 of the support 10 in the direction of a pre-positioned stator to be cut (not shown).

In accordance with the invention, the stator wire-cutting machine includes knife means rotatably mounted on the cutter disc for penetration of the wires of the stator upon limited rotation of the cutter disc. As embodied herein, the knife means includes a cutting blade 24 pivotably mounted on the cutter disc 20 near the perimeter of the disc. The cutting blade 24 has a sharpened cutting surface at one end thereof, also oriented toward the prepositioned stator. The cutting blade 24 is secured to the cutter disc 20 by a pivot 23 located near the cutting surface of the blade 24. The blade 24 is held in alignment with the wires of the stator by a spring 27 which applies force to urge the cutting end of blade 24 against a guide 30.

In accordance with the invention, the stator wire-cutting machine also includes means mounted on the cutter disc for rotating the knife means with respect to the cutter disc and for cutting the wires upon further rotation of the cutter disc. As embodied herein, the means for rotating the knife means includes a projection 21 mounted on the cutter disc 20 to interact with a notch 29 in the rear end of the cutting blade 24 at a predetermined point during the clockwise rotation of the cutter disc 20. After the projection 20 strikes the notch 29 on the cutting blade 24, further rotation of the cutter disc 20 causes cutting blade 24 to rotate about its pivot point 23 thereby cutting the wires.

In accordance with the invention, the stator wire-cutting machine also includes means for removing the cut wire from the stator. As embodied herein, the means for removing the wire includes a kick-out disc 22 rotatably mounted on the support 10 directly under the cutter disc 20, the centers of the two discs being in substantial alignment as to the forward edge 11 of the support 10.

The wire-removing means also includes penetration means rotatably mounted on the kick-out disc for penetration of the wires of the stator upon limited rotation of the kick-out disc. As embodied herein, the penetration means includes a puller bar 25 rotatably mounted at pivot 26 near the perimeter of the kick-out disc 22. The puller bar 25 has a pointed end oriented towards the pre-positioned stator for penetration of the wires. The pointed end of the puller bar 25 is held in alignment with the wires by a spring 28 which urges the bar 25 against a guide 32.

Preferably, the precise spacing of the blade 24 and the puller bar 25 may be adjusted by moving the pivot point 44 of the cutter disc within slot 45, as shown in FIG. 2, and by loosening set screw 40 to adjust the spacing of cutter and puller bar guides 30 and 32.

As may be seen in FIG. 2, the pivot point of the kick-out disc 22 may also be adjusted to move it closer or farther away from the forward edge 11 of the support 10. This is accomplished by mounting the pivot of the kick-out disc 22 to a kick-out disc securing plate 39 which is slideably positioned in a slot 50 on the support 10. The kick-out disc may be adjusted by loosening screws 42 and sliding the entire kick-out disc assembly within slot 50.

Preferably, the guides 30 and 32 are adjustably mounted to the kick-out disc securing plate 39 by attaching U-shaped piece 43 to plate 39 and tightening set-screw 40. This configuration allows the guide spacing to be adjusted for various size stators, and allows for re-positioning of the kick-out disc 22 closer or farther from the stator without the need for relocating guides 30 and 32.

In accordance with the invention, the means for removing the cut wire from the stator also includes means mounted on the kick-out disc 22 and a stud 36 mounted on the support 10, which interact to rotate the penetration means with respect to the kick-out disc and pull the wires out of the stator upon further rotation of the kick-out disc. As embodied herein, the means for rotating the penetration means includes a camming guide 37 and a stop arm 34, both pivoted in the kick-out disc 22, and an idler link 35 movably joining the camming guide 37 and the stop arm 34. A curved surface 38 on one end of the camming guide 37 contacts the end of the puller bar 25 remote from the pointed end thereof. At a predetermined point during the rotation of the kick-out disc 22, the stop arm 34 comes in contact with the stud 36. Further rotation of the kick-out disc 22 causes the stop arm to rotate about its pivot in the kick-out disc thereby pulling down on the idler link 35 and forcing the camming guide 37 upward against the puller bar 25. This action causes the puller bar to rotate about its pivot point 26 in the kick-out disc 22, thereby pulling the wires out of the stator.

In accordance with the invention, the stator wire-cutting machine also includes means for rotating the cutter disc. As herein embodied, the latter means includes a main lever arm 14 pivoted in the support 10. The actuating end 49 of the main lever arm 14 may be connected to a device (not shown) for applying force to the lever. A primary connecting arm 16 is pivotably attached to the main lever arm 14 between the actuating end 49 and the fulcrum 15. The end 53 of the primary connecting arm 16 remote from the main lever arm 14 is adjustably and rotatably attached to a cutter disc arm 17. The cutter disc arm 17 is fixed to the cutter disc 20. Downward movement of the main lever arm 14 pulls down on the primary connecting arm 16 and thereby applies a force on the cutter disc arm 17 causing the cutter disc to rotate in a clockwise direction.

Moving the main lever arm 14 back to its original position returns the stator wire-cutting machine to its starting point. Preferably, the main lever arm 14 is actuated by an air cylinder, but any means of applying force is suitable.

As embodied herein, the means for rotating the cutter disc 20 also includes means for counter-rotating the kick-out disc 22. The latter means includes a secondary connecting arm 18 pivotably attached to the operating end 47 of the main lever arm 14 on the opposite side of the fulcrum 15 from the actuating end 49. The end of the secondary connecting arm 18 remote from the main lever arm 14 is pivotally attached to a kick-out disc 22. A downward force on the main lever arm 14 therefore causes the secondary connecting arm 18 to move upward thereby exerting a force on the kick-out disc arm 19 and causing the kick-out disc 22 to rotate in a counter-clockwise direction.

As embodied herein, and as best seen in FIG. 2, the main lever arm 14 is adjustably mounted in a slot 13 by a screw and washer arrangement at the fulcrum 15. Realignment of the fulcrum 15 within the slot 13 is accomplished by loosening the connection and sliding pivot point 15 in either direction within the slot. This adjustment controls the timing of the sequence of penetration of the cutting blade 24 and the puller bar 25 into the wires of the stator.

Preferably, the depth of penetration of the cutting blade 24 into the wires of the stator, prior to the actual cutting operation, is adjustable by sliding a bolt 48 within a slot 46 in the upper end 53 of the primary connecting arm 16, as shown in FIG. 2.

Either the cutter disc assembly or the kick-out disc assembly may be used as separate embodiments of the invention if alternative means are provided for removing or cutting the wire, respectively. However, the embodiment employing both assemblies is preferred, since it provides for the cutting and removal of stator wires in a single, continuous, mechanical operation. It will be apparent to those skilled in the art that various modifications and variations could be made in the structure of the invention without departing from the scope and spirit of the invention.

What I claim is:

1. A machine for removing wire from a stator, the stator being in a predetermined fixed position, the machine comprising:
    a planar support for substantial alignment with the axis of the stator;
    a cutter disc rotatably mounted on said support;
    means for rotating said cutter disc;
    knife means rotatably mounted on said cutter disc for penetration of the wires of said stator upon limited rotation of said cutter disc;
    means mounted on said cutter disc for rotating said knife means with respect to said cutter disc and for cutting said wires upon further rotation of said cutter disc; and
    means for removing the cut wire from the stator.

2. The machine of claim 1 wherein said means for rotating the cutter disc are lever-actuated.

3. The machine of claim 2 wherein said cutter disc is adjustably mounted in said support.

4. The machine of claim 3 wherein said knife means includes an elongated blade having a sharpened cutting end and a notched end.

5. The machine of claim 4 also including a guide adjustably mounted on said frame for substantial alignment of said cutting blade with the wires of said stator, said cutting end of said blade being biased against said guide.

6. The machine of claim 5 wherein said means for rotating said cutter disc includes a main lever arm pivoted in said support, a primary connecting arm pivoted at one end in said main lever arm, and a cutter disc arm having one end rotatably mounted to the other end of said primary arm and having the other end fixed to said cutter disc for rotating said cutter disc upon actuation of said main lever arm.

7. The machine of claim 6 wherein said one end of said cutter disc arm is also adjustably mounted to said other end of said primary connecting arm.

8. The machine of claim 7 wherein said main lever arm is adjustably mounted in said support.

9. The machine of claim 8 wherein said means for rotating said knife means with respect to said cutter disc includes a projection mounted on said cutter disc arm for interacting with the notched end of said cutting blade at a predetermined point during the rotation of said cutter disc.

10. A machine for removing wire from a stator, the stator being in a predetermined fixed position, the machine comprising:
    a planar support for substantial alignment with the axis of the stator;
    means for cutting the wires of said stator;
    a kick-out disc rotatably mounted on said support;
    penetration means rotatably mounted on said kick-out disc for penetration of said wires of said stator upon limited rotation of said kick-out disc;
    a stud fixed on said support;
    means mounted on said kick-out disc interacting with said stud for rotating said penetration means with respect to said kick-out disc and pulling the wires out of said stator upon further rotation of said kick-out disc, after said wires have been cut by said cutting means.

11. The machine of claim 10 wherein the means for rotating said kick-out disc are lever-actuated.

12. The machine of claim 11 wherein said kick-out disc is adjustably mounted in said support.

13. The machine of claim 12 wherein said penetration means includes an elongated pointed puller bar for penetrating under the wires of said stator.

14. The machine of claim 13 also including a guide adjustably mounted on said frame for substantial alignment of said puller bar with the wires of said stator, said pointed end of said puller bar being biased against said guide.

15. The machine of claim 14 wherein said means for rotating said kick-out disc includes a main lever arm pivoted in said support, a secondary connecting arm pivoted at one end in said main lever arm, and a kick-out disc arm having one end rotatably mounted to the other end of said secondary arm and having the other end fixed to said kick-out disc for rotating said kick-out disc upon actuation of said main lever arm.

16. The machine of claim 15 wherein said main lever arm is adjustably mounted in said support.

17. The machine of claim 16 wherein said means for rotating said penetration means with respect to said kick-out disc includes a camming guide pivoted in said kick-out disc having a camming surface at one end, said camming surface butting against said puller bar, a stop arm pivoted in said kick-out disc, and an idler link pivotably connected to the other end of said camming guide and to said stop arm.

18. A machine for cutting wire from a stator, the stator being in a predetermined fixed position, the machine comprising:
    a planar support for substantial alignment with the axis of the stator;
    a cutter disc and a kick-out disc rotatably mounted on said support;
    means for the counter-rotation of said discs;
    knife means and penetration means rotatably and respectively mounted on said cutter disc and said kick-out disc for penetration of the wires of said stator upon limited counter-rotation of said discs;
    means mounted on said cutter disc for rotating said knife means with respect to said cutter disc and for cutting said wires upon further rotation of said cutter disc;
    a stud mounted on said support; and
    means mounted on said kick-out disc interacting with said stud for rotating said penetration means with respect to said kick-out disc and pulling the wires out of said stator after said further rotation of said cutter disc.

19. The machine of claim 18 wherein said means for counter-rotation of said discs are lever-actuated.

20. The machine of claim 19 wherein said means for counter-rotation of said discs includes a main lever arm pivoted in said support, primary and secondary connecting arms each having one end respectively pivoted in said main lever arm on opposite sides of the fulcrum thereof, a cutter disc arm having one end pivoted in the other end of said primary connecting arm and having its other end fixed to said cutter disc, and a kick-out disc arm having one end pivoted in the other end of said secondary connecting arm, and having its other end fixed to said kick-out disc.

* * * * *